(12) United States Patent
Liu et al.

(10) Patent No.: US 8,193,902 B2
(45) Date of Patent: Jun. 5, 2012

(54) REMOTE CONTROL HANDSET

(75) Inventors: Chris Shi-Chai Liu, London (GB); Goro Takaki, London (GB); Henry Newton-Dunn, Santa Monica, CA (US); Roger Ibars, Bellaterra (ES)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 12/265,346

(22) Filed: Nov. 5, 2008

(65) Prior Publication Data

US 2009/0201168 A1 Aug. 13, 2009

(30) Foreign Application Priority Data

Dec. 20, 2007 (GB) .................................... 0724903.0

(51) Int. Cl.
- *G05B 19/02* (2006.01)
- *G09G 5/00* (2006.01)
- *G06F 3/041* (2006.01)
- *G06F 3/033* (2006.01)

(52) U.S. Cl. .......... 340/4.3; 345/156; 345/157; 345/173

(58) Field of Classification Search .................. None
See application file for complete search history.

(56) References Cited

U.S. PATENT DOCUMENTS

| 6,577,298 B2 * | 6/2003 | Krog .............................. 345/161 |
| 2002/0158838 A1 * | 10/2002 | Smith et al. .................... 345/156 |
| 2004/0046741 A1 | 3/2004 | Low et al. |
| 2004/0108990 A1 | 6/2004 | Lieberman et al. |
| 2004/0152414 A1 * | 8/2004 | Wang ............................ 455/3.04 |
| 2005/0212752 A1 * | 9/2005 | Marvit et al. ................. 345/156 |
| 2006/0197750 A1 | 9/2006 | Kerr et al. |
| 2008/0062141 A1 * | 3/2008 | Chandhri ...................... 345/173 |

FOREIGN PATENT DOCUMENTS

WO   WO 98/08241   2/1998

OTHER PUBLICATIONS

U.S. Appl. No. 12/466,133, filed May 14, 2009, Takaki.
Office Action issued Nov. 21, 2011 in United Kingdom Application No. GB0724903.0.

* cited by examiner

*Primary Examiner* — George Bugg
*Assistant Examiner* — Renee Dorsey
(74) *Attorney, Agent, or Firm* — Oblon, Spivak, McClelland, Maier & Neustadt, L.L.P.

(57) ABSTRACT

A remote control handset for intuitively navigating a user interface of an entertainment device, the user interface having a hierarchical menu structure. The remote control handset of the present invention is not required to have any buttons. The remote control handset has a first control surface, and a second control surface. The first control surface has a substantially planar portion and allows navigation with a level of the hierarchical menu structure. The second control surface has a component in an axis that is normal to the substantially planar portion of the first control surface, and is for navigating between the levels of the hierarchical menu structure.

17 Claims, 5 Drawing Sheets

REMOTE CONTROL HANDSET

FIELD OF THE INVENTION

The present invention relates to a new remote control handset, in particular to a remote control handset for navigating a user interface of an entertainment device, and a method of navigating a user interface, in particular a method of navigating a user interface for an entertainment device using a remote control handset.

DESCRIPTION OF THE RELATED ART

Remote control devices are currently used to control various functions of an entertainment device, such as a television. As entertainment devices become more complex (for example by having a large number of television, radio and/or IPTV channels available, and by being able to reproduce a variety of formats, such as photographs, music, and video, and the internet) it has become increasingly common to use the remote control handset for navigating a user interface in order to control various functions of and options available to the entertainment device.

The present invention recognises that, previously, the various control surfaces and buttons provided on a remote control handset do not physically correspond to the user interface which the remote control handset is controlling in any logical way that would help the user to navigate the user interface. Thus, the user of such a remote control handset has to move their attention between the remote control handset and the user interface in order to navigate the user interface using the remote control handset. In other words, there is currently no logical link between the structure of the remote control handset and the user interface which it is being used to control.

OBJECTS AND SUMMARY OF THE INVENTION

According to the present invention there is provided a method of navigating a user interface for an entertainment device using a remote control handset, the user interface having a hierarchical menu structure, and the method comprising:

providing a remote control handset having a first control surface and a second control surface;

arranging the first control surface with a substantially planar portion that lies substantially in a plane defined by a first axis and a second axis that is orthogonal to the first axis;

arranging the second control surface with a component in a third axis that is orthogonal to the first and second axes;

navigating within a level of the hierarchical menu structure using the first control surface; and navigating between the levels of the hierarchical menu structure using the second control surface.

According to the present invention there is also provided a remote control handset for navigating a user interface of an entertainment device, the user interface having a hierarchical menu structure with at least two levels, the remote control handset comprising:

a first control surface configured to allow navigation within a level of the menu structure, the first control surface having a substantially planar portion that lies substantially in a plane defined by a first axis and a second axis that is orthogonal to the first axis; and a second control surface configured to allow navigation between levels of the menu structure, the second control surface having a component in a third axis that is orthogonal to the first and second axes.

Providing such a remote control handset for navigating a user interface enables the user interface to be navigated in a more logical and intuitive manner than would be the case with a conventional remote control handset. As such, the navigation of the user interface can be more efficient and quick.

Preferably, the first axis is provided in a width direction of the first control surface (or handset);

the second axis is provided in a longitudinal direction of the first control surface (or handset); and a cross-section taken at a constant value on the second axis, through the first control surface or the second control surface, is a straight line having a constant value on the third axis.

According to this arrangement, the remote control handset is provided with a constant gradient in the width direction (i.e. the first axis direction). In other words, a cross-section at a given position in the longitudinal direction has a constant value in the third axis direction. According to this arrangement, movement along one and/or both of the control surfaces in the first axis (width) direction would not result in any movement in the third axis direction. The handset could then be arranged such that this movement in only the width direction could result in no navigation between the levels of a menu structure, thereby making the remote control handset still more intuitive to use.

Preferably, the remote control handset is provided with at least a part of the second control surface being planar. Accordingly, a user is able to more intuitively navigate between the levels of a menu structure.

Preferably, the remote control handset is provided with the first control surface and the second control surface being immediately adjacent to each other. As such, the two control surfaces are physically directly connected. According to this arrangement, a user can use the remote control handset to navigate within levels of a menu structure, and between levels of a menu structure, without physically leaving the control surfaces.

Preferably, the remote control handset is provided with the first control surface and a second control surface forming a single surface having a continuous gradient. This means that the remote control handset has a single, continuous, surface for navigating between and within levels of a menu structure, with that single surface having no discontinuities. This allows a user to move between and within the levels of a menu structure seamlessly and intuitively without experiencing a step change in gradient of the single control surface.

According to one arrangement, the remote control handset is further provided with a third surface which is directly connected to both the first control surface and the second control surface so as to join the first control surface and the second control surface together. Accordingly, there is provided a surface to join the first control surface and the second control surface, with that joining, third, surface not being used to navigate the user interface of the entertainment device. As such, there can be provided an area of the remote control handset between the first control surface (for allowing navigation within a level of a menu structure) and the second control surface (for providing navigation between levels of the menu structure), such that the two control surfaces are separated. This may assist the user of the remote control handset to operate the control surface that they desire to operate, without accidentally operating the other control surface. For example, it may assist the user to navigate within a particular level of a menu structure using the first control surface, without accidentally moving between levels of the menu structure by operating the second control surface by mistake.

Preferably, the third surface connecting the first control surface and the second control surface can be provided such that the first control surface, the second control surface and the third surface form a single surface having a continuous gradient. Accordingly, the three surfaces would be joined together such that there are no discontinuities. This would enable the user of the remote control handset to move more seamlessly and intuitively from the first control surface (allowing navigation within a level of a menu structure) to the second control surface (allowing navigation between levels of a menu structure) via the third surface.

Preferably, the remote control handset is provided with one or both of the control surfaces comprising a touchpad. This increases the ease of use of the remote control handset, because the entire menu structure of the user interface of the entertainment device could be navigated by simply moving a suitable device, across the touchpad or touchpads.

Preferably, the remote control handset is provided with one or both of the control surface(s) being configured to be responsive to movement of a finger across its surface. This further increases the ease of use of the remote control handset, because the user can navigate the entire menu structure by simply moving his or her finger across the surface of the control surface(s).

According to one aspect of the invention there is provided a remote control handset for navigating a user interface of an entertainment device, or a method of navigating a user interface of an entertainment device using a remote control handset, with the remote control handset comprising a motion sensor configured to detect a specific movement of the handset, wherein the remote control handset is configured to send a specific command to the entertainment device when the motion sensor senses the specific movement of the handset.

This motion sensor feature of the remote control handset may or may not be combined with other features of a remote control handset disclosed herein. The specific movement that the motion sensor is configured to detect can be any particular movement of the handset. Furthermore, the specific movement can be correlated or linked with any particular function of the entertainment device. For example, a particular movement that a user intuitively makes when wanting the entertainment device to perform a particular function can be correlated to the entertainment device performing that particular function, with no other action necessarily being required. Thus, use of such a remote control handset can be more logical, efficient and intuitive than that of conventional remote control handsets.

Preferably, the remote control handset comprising a motion sensor can be provided with the motion sensor comprising a gyroscopic motion sensor. Any motion sensor could be used with such a remote control handset, but use of a gyroscopic motion sensor allows accurate measurement of a particular motion, such as acceleration (including deceleration) of the remote control handset.

Preferably, the remote control handset comprising a motion sensor is provided such that the specific movement that the motion sensor is configured to detect comprises acceleration or deceleration of the remote control handset that is above a pre-determined magnitude. This means that, for example, a flicking motion of the remote control handset, which would ordinarily result in acceleration or deceleration of a particularly high magnitude, could then be detected by the motion sensor.

Preferably, the remote control handset comprising a motion sensor is provided such that the specific command that is sent to the entertainment device causes the entertainment device to be either turned on, or turned off. This could be related to, for example, a flicking motion of the remote control handset that many users commonly make intuitively when turning on or turning off an entertainment device. Conventionally, such a motion would be combined with pressing of an on/off switch, but according to the present invention, the pressing of such a switch on the remote control handset would not necessarily be required, because the motion itself would be detected by the motion sensor and thus cause the entertainment device to be turned on/off.

In one arrangement, the remote control handset can be arranged such that the motion detected by the motion sensor (such as the flicking motion) may be combined with a particular action on the touchpad in order to make the entertainment device perform a function. For example, the flicking motion could be combined with a press or touch on the touchpad (for example a touch simulating the press of a button) in order to, for example, cause the entertainment device to be turned on/off. This could help to prevent accidentally switching the entertainment device on and/or off.

According to one arrangement, any of the remote control handsets described herein can be provided and/or configured to control a television set via a graphical user interface. Thus, although the remote control handset could be provided to control any entertainment device, via any user interface, it would be particularly suitable for controlling a television set via a graphical user interface.

According to the present invention there is also provided a control apparatus for an entertainment device comprising:

a remote control handset according to any remote control handset of the present invention discussed herein; and a user interface for an entertainment device, the user interface having a hierarchical menu structure with at least two levels, wherein the remote control handset is configured to navigate the user interface.

Accordingly, the present invention provides both the user interface for an entertainment device, and the remote control handset configured to navigate that user interface. Thus, the user of an entertainment device is provided with both the logical, efficient and intuitive remote control handset, together with the user interface that can be controlled logically, efficiently and intuitively by the remote control handset.

According to the present invention, there is also provided the control apparatus comprising a remote control handset and user interface defined above; and an entertainment device, wherein the control apparatus is configured to control the entertainment device.

As such, according to the present invention, there can be provided a remote control handset configured to navigate a user interface for an entertainment device, the user interface itself and the entertainment device.

DETAILED DESCRIPTION OF THE PREFERRED EMBODIMENTS

The invention will be more clearly understood from the following description, given by way of example only, with reference to the accompanying drawings.

Remote control handsets are commonly used for operating entertainment devices. Usually, the entertainment device is controlled using the remote control handset via a user interface. One or more buttons can be provided on the remote control handset in order to control the entertainment device, for example by using a button to select a particular feature, or alter a certain parameter.

Figure 1:
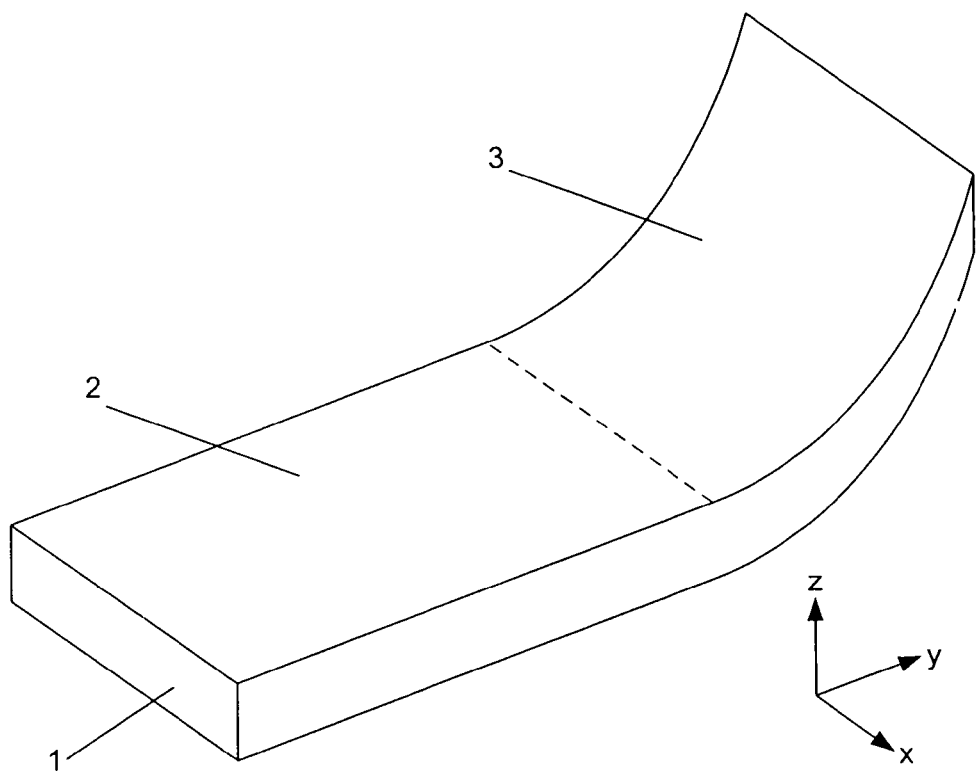
FIG. 1 illustrates a perspective view of an embodiment of a remote control handset according to the present invention.
Figure 2:
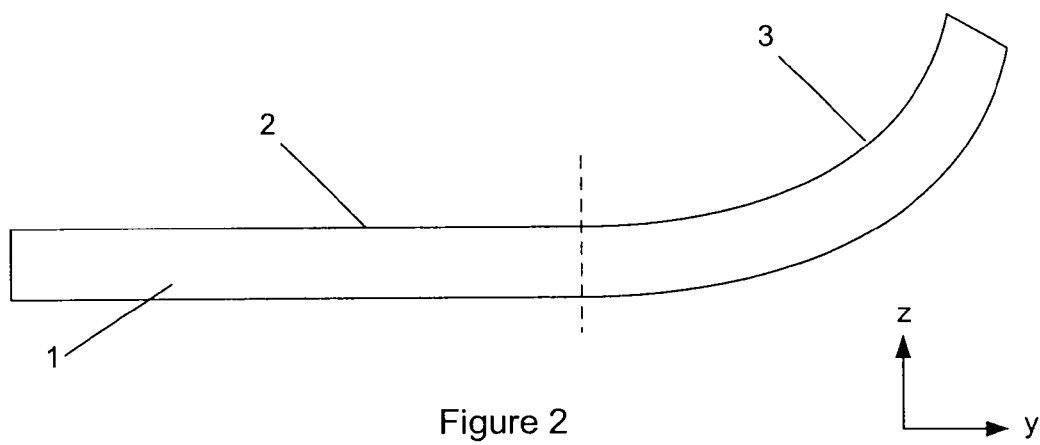
FIG. 2 illustrates a side view of the remote control handset of FIG. 1.

The remote control handset according to an embodiment of the present invention illustrated in FIGS. 1 and 2 does not require any buttons in order to control the entertainment device. Instead, the entertainment device can be controlled by using the remote control handset to navigate a user interface 4 installed on the entertainment device using only a first control surface 2 and a second control surface 3.

In alternative embodiments, one or more buttons may also be provided on the remote control handset, for example for turning the entertainment device on or off, but as described herein, it is not necessary for these buttons to be provided on a remote control handset 1 according to the present invention.

As illustrated, the first control surface 2 has a substantially planar portion and can be used to navigate within a particular level of a hierarchical menu structure 4, whereas the second control surface 3 has a component lying outside the planar portion of the first control surface 2 and can be used for navigating between the levels of a hierarchical menu structure i.e. from one level to another level.

FIGS. 1 and 2 include an illustration of an axis system that will be used to aid the description of the remote control handset 1 and its operation. According to the axis system shown in FIGS. 1 and 2, the substantially planar portion of the first control surface 2 lies substantially in a plane defined by and containing the x- and y-axes. The x-axis is in a width direction of the substantially planar portion of the first control surface 2, and the y-axis is in a longitudinal direction of the substantially planar portion of the first control surface 2. As is conventional, the z-axis is normal to the x-axis and the y-axis. The second control surface 3 has a component in the z-axis.

Figure 3:
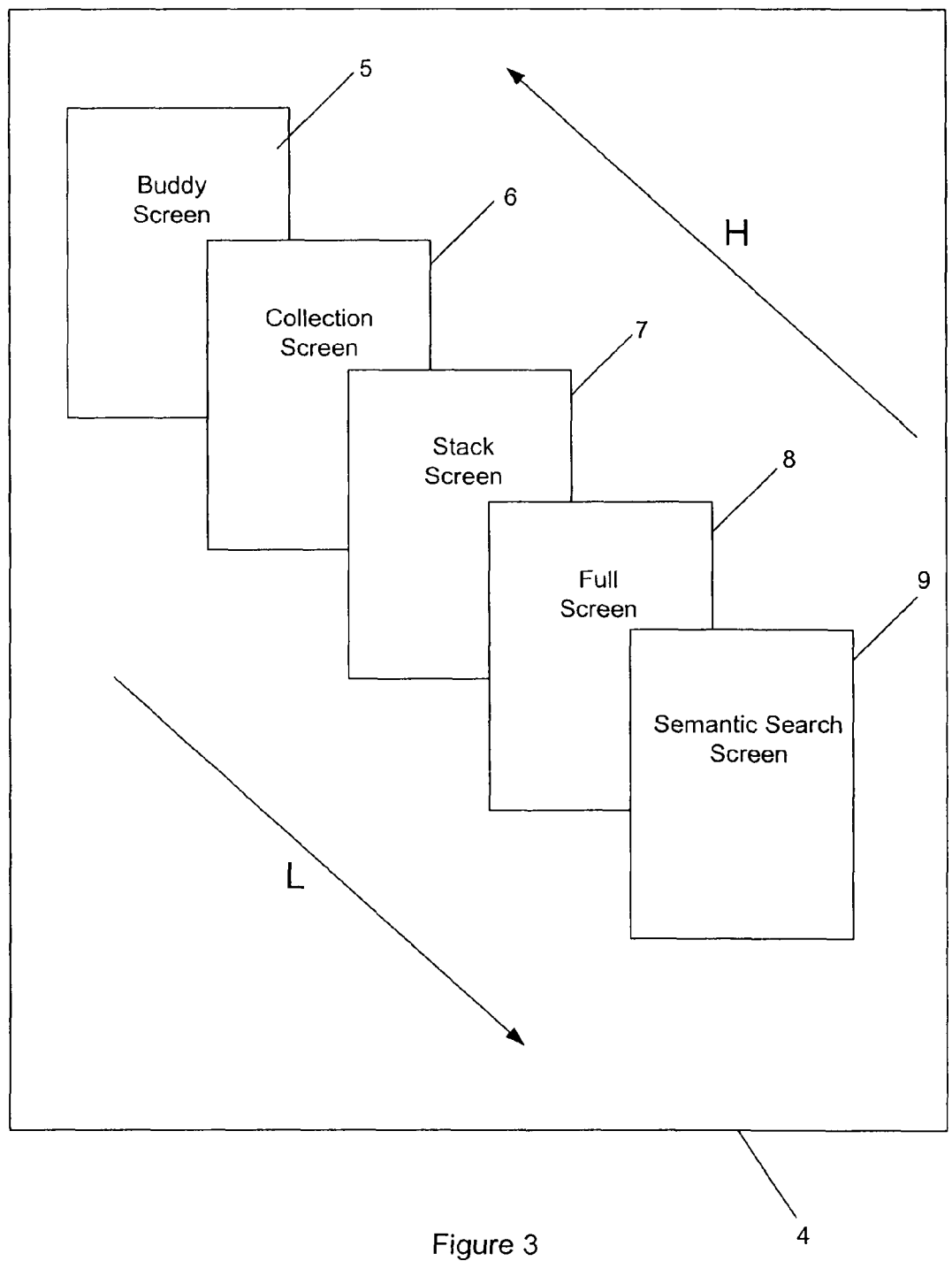
FIG. 3 illustrates a top-level layout of a graphical user interface having a hierarchical menu structure which can be navigated using a remote control handset.

An example of a typical hierarchical menu structure 4 that may be controlled using the remote control handset of the present invention is shown in FIG. 3. This menu structure 4 has five primary levels: a "buddy screen" 5; a "collection screen" 6; a "stack screen" 7; a "full screen" 8; and a "semantic search" screen 9.

The user interface, or menu structure 4, can be accessed using the remote control handset 1 by performing any suitable action on the remote control handset 1. For example, the menu structure could be accessed by shaking the remote control handset 1 (in an embodiment which includes a motion sensor), or by the user moving their finger across one or both of the first and second control surfaces 2, 3. Alternatively, the menu structure could be accessed by the user moving one of their fingers across one of the control surfaces 2, 3 in a particular manner (such as a "cross" motion or a "circle" motion) or in any other suitable way.

According to the illustrated embodiment, the first level of the menu structure that is accessed when the user interface is opened is the collection screen 6. A typical example of what the collection screen 6 may look like is shown in FIG. 4.

According to the illustrated embodiment, the user interface 4 for use with the remote control handset 1 is an interest-based framework. As such, the user interface 4 is tailored to the particular interest of the user of the entertainment device and remote control handset 1, and may be used navigate a range of different content or media types. Accordingly, the collection screen 6 contains a number of different options which can be selected, all of which can be tailored to the user's particular interest. Furthermore, according to the illustrated user interface, each of the options that can be selected from collection screen 6 can contain media or content of different types, such as photographs, live television, recorded television, web-based services, music, films, and computer games. This list is not intended to be exhaustive, and any other type of content or media may also be accessible through the various options on the collection screen 6.

Figure 4:
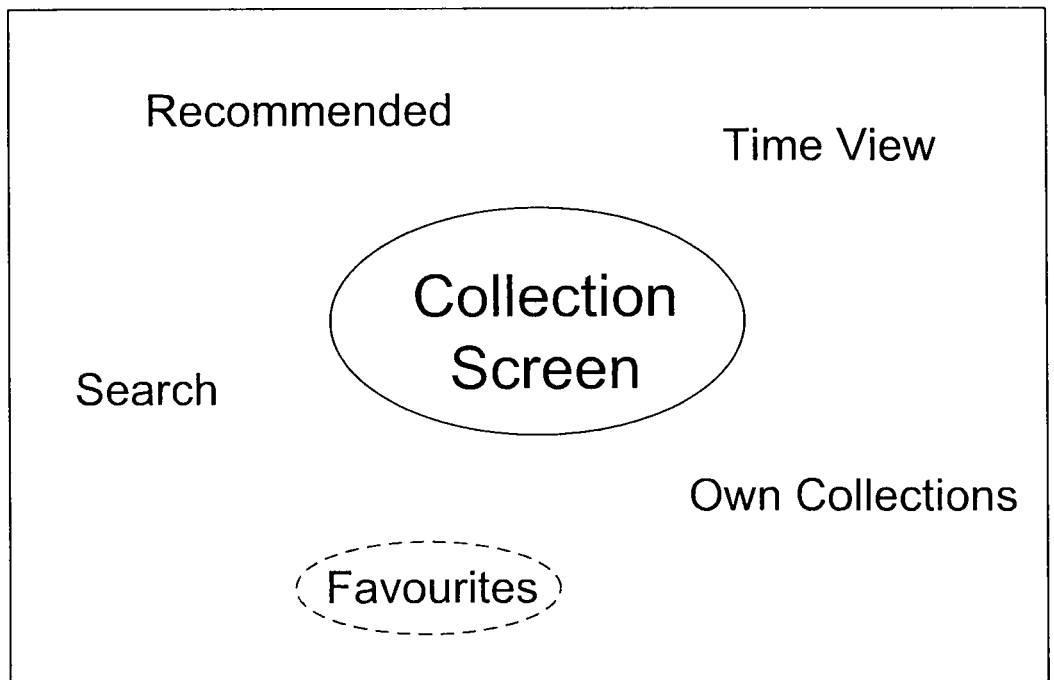
FIG. 4 illustrates an exemplary layout of a screen provided at a particular level of the hierarchical menu structure, the screen being referred to hereinafter as the "collection screen"

In the particular embodiment illustrated in FIG. 4 the collection screen 6 contains five possible options: "recommended"; "search"; "favourites", "own collections"; and "time view". Other graphical user interfaces suitable for use with the remote control handset 1 of the present invention could have a collection screen (or equivalent) with more, fewer, and/or different selectable options.

As described above, the remote control handset 1 according to the illustrated embodiment has a first control surface 2 and a second control surface 3. The first control surface 2 is for navigating within a particular level of a hierarchical menu structure 4. As such, the first control surface 2 can be used to navigate within the collection screen 6. Thus, for example, if the five options available in the illustrated example of collection screen 6 were arranged in a circle around the centre of the screen, as in FIG. 4, then the user could change which of these is highlighted for selection by rotating his/her finger on the first control surface 2 in a substantially circular motion. Alternatively, any other particular movement on the first control surface 2 could be associated with changing which of the collection screen 6 options is highlighted for selection. For example, the remote control device 1 and user interface 4 could be arranged such that movement in the positive y-axis (or x-axis) direction on the first control surface 2 could result in the highlighted option being rotated by one option in the clockwise direction, and movement on the first control surface 2 in the negative y-axis (or x-axis) direction could result in the highlighted option being rotated by one option in the anticlockwise direction.

Any suitable manner of indicating which of the options is highlighted for selection could be used. For example, the particular option could change colour, or become highlighted, or the options could rotate with the motion on the first control surface 2 such that the option highlighted for selection is always at the top (or bottom) of the screen. In the example illustrated in FIG. 4, the "favourites" option is shown as being highlighted by being surrounded by a dashed line. Thus, according to the remote control handset 1 and user interface 4 of the illustrated embodiment, there is no requirement for there to be a pointer shown on the screen of the entertainment device which moves in accordance with the movement of the user's finger across the first control surface. However, in alternative embodiments, such an on-screen pointer may be used.

Once the option that the user wants to select, in this case the collection screen, has been highlighted by navigating within the particular level using the first control surface 2 of the remote control handset 1, it can be selected, opened, or accessed using the second control surface 3. The user interface 4 could be arranged to be responsive to any suitable motion on the second control surface 3. In the illustrated embodiment, any motion along the second control surface 3 comprising motion in the positive z-axis direction results in the highlighted option being selected. According to the illustrated embodiment of the remote control handset 1, this could be achieved by the user simply moving their finger from the first control surface 2 to the second control surface 3, without the finger ever leaving the surfaces 2, 3 of the remote control handset. Alternatively, the user could remove their finger from the first control surface 2 (used for highlighting the option for selection), and then place it onto the second control surface 3 and performing the necessary motion.

The five options available through collection screen 6 shown in FIG. 4 will now be described.

According to the collection screen 6 illustrated in FIG. 4, the "recommended" option contains content that has been recommended, for example by other users having a similar entertainment device. This content can be accessed by selecting the "recommended" option using the remote control handset 1 in the manner described above.

The "search" option on the collection screen is also selected using the remote control handset 1 in the manner set out above. Selection of the "search" option allows the user to access a search page, through which a search can be performed. The search can be a textual search (which can be input, for example, either by an associated keyboard or by using a stylus or finger to write on one of the control surfaces 2, 3 of the remote control handset), or a picture based search based on a picture stored on the entertainment device, or input through a camera (which could be either external or internal to the remote control handset 1). The search itself could be performed just on content currently stored on, for example, a hard drive or "plug-and-play" media of the entertainment device, on external content (for example internet content), or on both.

Selection of the "time view" option on the collection screen 6 in the manner described above allows the user to access an electronic programme guide for broadcast television programmes. The electronic programme guide can be configured to show both previous programmes (which may, for example, still be available through "on-demand" services) and for current and future programmes.

Selection of the "own collections" option on the collection screen 6 in the manner described above allows the user to access content that they have put into their own collections. This could be any content, such as, for example, collections of photographs, music and/or a combination of photographs and music.

Selection of the "favourites" option (shown as highlighted in FIG. 4) on the collection screen 6 in the manner described above allows the user to access content that they have marked as being part of the favourite content.

The hierarchical menu structure of the user interface 4, and the navigation thereof using the remote control handset 1 of the present invention will now be further described following selection, using the remote control handset 1 in the manner described above, of the "favourites" option on the collection screen 6.

Figure 5:
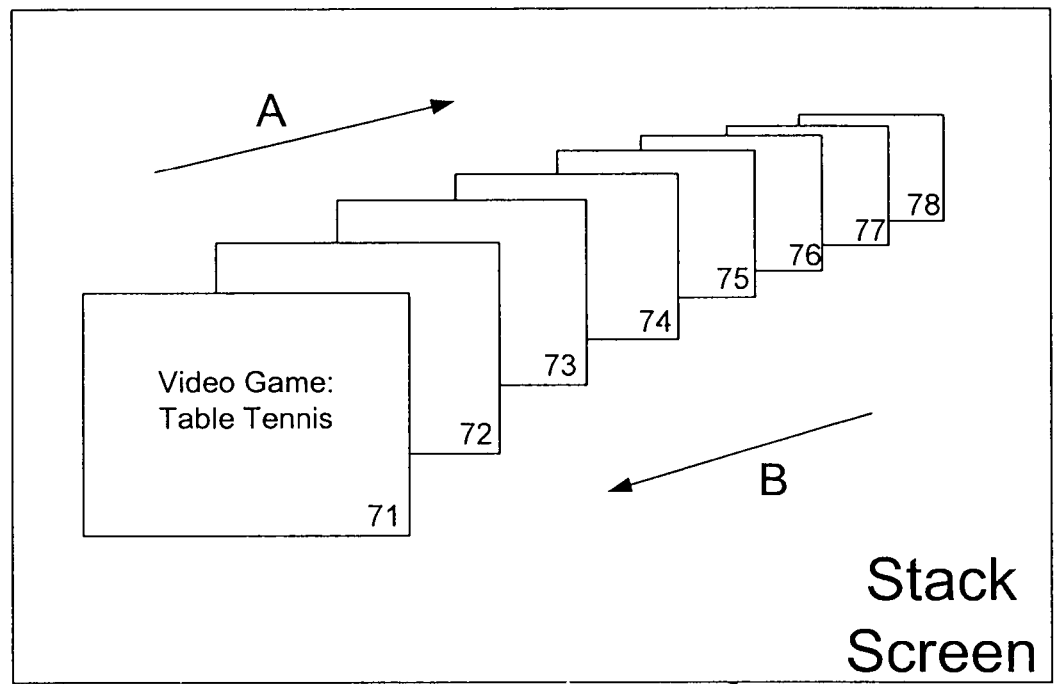
FIG. 5 illustrates an exemplary layout of a screen provided at a particular level of the hierarchical menu structure, the screen being referred to hereinafter as the "stack screen"

Once the "favourites" option has been selected from the collection screen 6, a stack screen 7 appears on the graphical user interface 4. An example of a stack screen 7 is shown in FIG. 5. According to the illustrated embodiment, the stack screen 7 shows items which the user of the remote control handset 1 and entertainment device has selected as being favourites of theirs. The stack screen 7 may include many different types of content and/or media. For example, it may include all types of media that can be played using the entertainment device. These may include, for example, photographs, recorded television programmes, presently playing television programmes, music, video games, films and/or websites. In the stack screen 7 shown in FIG. 5, for example, option 71 is a video game, option 72 may be a film, option 73 may be a photograph, option 74 may be a piece of music, option 75 may be a television program, option 76 may be a recorded television program, option 77 may be a web-page, and option 78 may be another film. In other embodiments, there may be fewer or more options than those shown in the FIG. 5 example, depending on how much content the user has marked as being "favourite".

Using the remote control handset 1 of the preferred embodiment, the user may scroll through the various options available in the stack screen 7 using the first control surface 2. In this way, the user is able to highlight any particular favourite option, either for selection or to find out more information about it.

Any suitable motion on the first control surface 2 could be used to scroll through the options on the stack screen 7. For example, the remote control handset 1 and user interface 4 may be configured such that moving along the first control surface 2 in one direction (for example in the positive y-axis (or x-axis) direction as shown in FIG. 2) results in the options being scrolled through in a particular order on the stack screen 7 (for example in direction A as shown in FIG. 5), and moving in the other direction along the first control surface 2 results in the options being scrolled through in the other direction (for example in direction B as shown in FIG. 5).

Once the user has highlighted the particular option on the stack screen 7 that they wish to select, they can then select this option using the second control surface 3 on the remote control handset 1. In the example shown in FIG. 5, it is the option that is at the front of the stack that is highlighted for selection—in this case the table tennis video game. Again, any suitable motion on the second control surface 3 could be correlated with selecting the highlighted option on the stack screen 7. For example, in the preferred embodiment, motion along the positive y-axis and positive z-axis direction on the second control surface 3 results in the highlighted option on the stack screen 7 being selected.

The graphical user interface 4 for use with the remote control handset 1 according to the preferred embodiment can have further features as desired. For example, when scrolling through the stack screen 7 using the first control surface 2 of the remote control handset 1, if the scrolling process is stopped for a certain period of time (for example, two seconds) then a description of the highlighted option may appear on the screen. This description may include information added by the user, information added by other users who have accessed that particular content, or information provided with the content itself (for example, the length and/or synopsis of a film).

Figure 6:
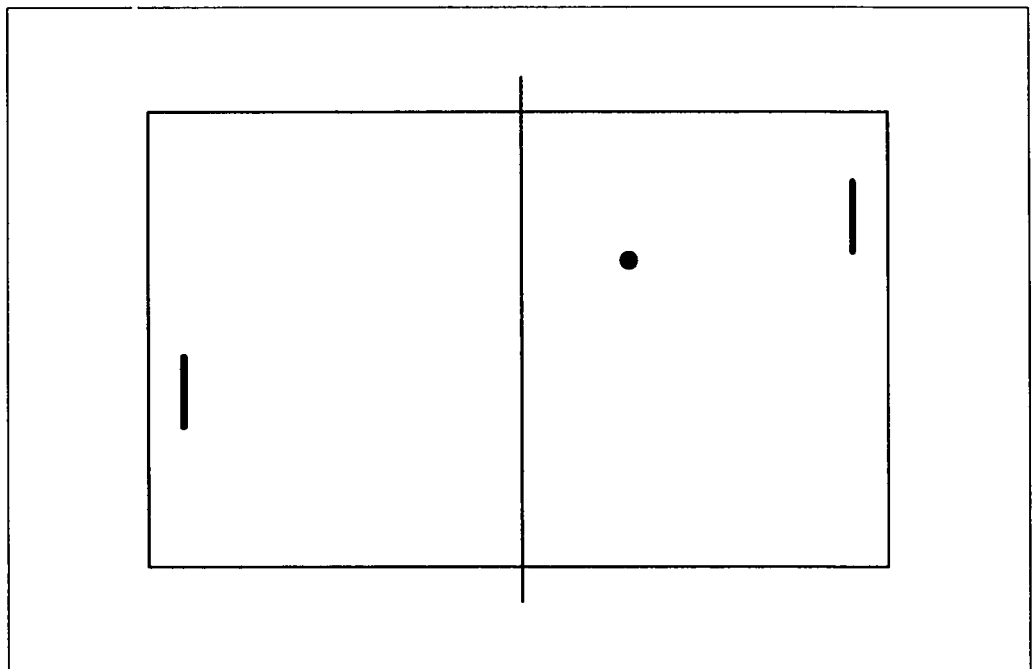
FIG. 6 illustrates an exemplary layout of a screen provided at a particular level of the hierarchical menu structure, the screen being referred to hereinafter as the "full screen"

Once a particular option has been selected from the stack screen 7, its content appears on an output screen of an entertainment device, for example on full screen 8 shown in FIG. 6. The user then has access to that content for viewing, playing (in the case of video games) or listening to. The illustrated embodiment will be further described on the basis of a video game being accessed from the stack screen 7.

According to the preferred embodiment, it is possible to make comments on and/or contact other, remote, users of a similar entertainment device whilst the selected option from the stack screen 7 is being accessed on full screen 8. For example, it is possible to use the first control surface 2 of the remote control handset 1 to write messages. This feature could be accessed by any suitable motion on the first control surface 2. For example, this could be a "scribbling" motion on the first control surface, such as rapidly alternating motion in the substantially positive y-axis direction and substantially negative y-axis direction. Once the writing function has been accessed by using the appropriate motion on the first control surface 2, text can be written using either the user's finger, or a stylus on the first control surface 2, and that text will then appear on the screen. This allows the user to communicate with other users and to make notes, for example for future reference, on the content being accessed using the remote control handset 1.

In the illustrated embodiment of hierarchical graphical user interface 4 shown in FIG. 3 of the illustrated embodiment, the next level down (i.e. in the "L" direction shown in FIG. 3) from the full screen 8 is the semantic search screen 9. Again, the user is able to move between the full screen 8 and the semantic search screen 9 using an appropriate motion on the second control surface 3 of the remote control handset 1. For example, in the preferred embodiment, this motion is a movement across the second control surface 3 in the positive y-axis and positive z-axis direction.

Selecting the semantic search option by using the appropriate motion on the second control surface 3 results in a search being performed (for example by the entertainment device) for content, that is accessible to the entertainment device, relating to that being viewed on the full screen 8. In the preferred embodiment, this search is performed using the meta data associated with the content currently being accessed on the full screen 8.

Figure 7:
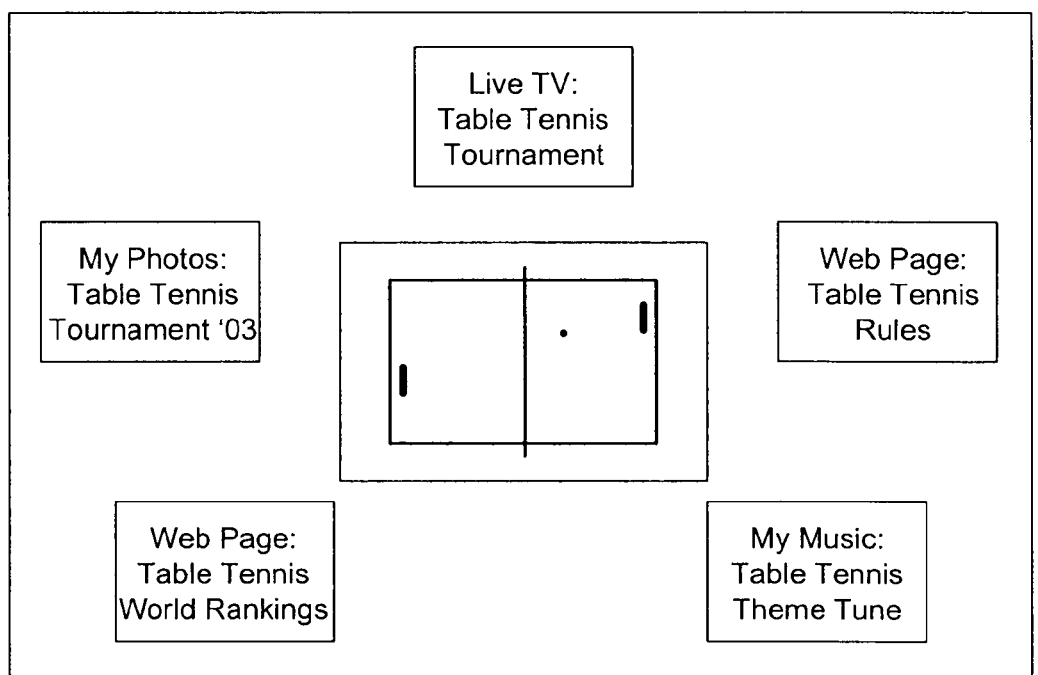
FIG. 7 illustrates an exemplary layout of a screen provided at a particular level of the hierarchical menu structure, the screen being referred to hereinafter as the "semantic search screen"

An example of the resulting semantic search screen 9 is shown in FIG. 7. As with the collection screen 6 and the stack screen 7, the various options available in the semantic search screen 9 can be highlighted for selection using an appropriate motion on the first control surface 2 of the remote control handset 1. In the illustrated embodiment, that motion is a circular motion across the first control surface 2. In alternative embodiments, the motion could be a positive or negative motion in either the x-axis or y-axis directions.

Once the desired content has been highlighted for selection on the semantic search screen 9, it can be accessed using an appropriate motion on the second control surface 3. In the illustrated embodiment of graphical user interface 4, because the semantic search screen 9 is the lowest level of the user interface 4, the only option that the user has from this level is to return to the "full" screen 8. Therefore, more than one motion on the second control surface 3 may be correlated with moving between the semantic search screen 9 and the full screen 8. For example, motion in either the positive y-axis and positive z-axis directions, or the negative y-axis and negative z-axis directions could result in the highlighted content on the semantic search screen 9 being accessed on the full screen 8.

Thus far, the description of the illustrated embodiment has focussed on moving towards lower levels of the hierarchical menu structure of the graphical user interface 4, i.e. in direction "L" shown in FIG. 3. However, it is also possible to use the second control surface 3 of the remote control handset 1 in order to move towards higher levels of the hierarchical menu structure 4 i.e. in direction "H" shown in FIG. 3. Again, this can be achieved by using an appropriate motion across the second control surface 3. For example if, as described in relation to the illustrated example above, the motion used for moving in the direction "L" of the hierarchical menu structure is in the predominantly positive y-axis and positive z-axis direction on the second control surface 3, then the motion used for moving in the direction "H" of the hierarchical menu structure 4 would most appropriately be predominantly in the negative y-axis and negative z-axis directions. Thus, the user of the remote control handset 1 controlling the entertainment device could move from the full screen 8 back to the collection screen 6 by making two separate motions across the second control surface 3, with both movements being in the predominately negative y-axis and negative z-axis directions.

As shown in FIG. 3, there is one level above the collection screen 6 in the illustrated embodiment, namely the buddy screen 5. Accordingly, one further motion across the second control surface 3 which correlates with movement up the hierarchical menu structure (i.e. in direction "H") takes the user from the collection screen 6 to the buddy screen 5. An example of the buddy screen 5 is shown in FIG. 8.

Figure 8:
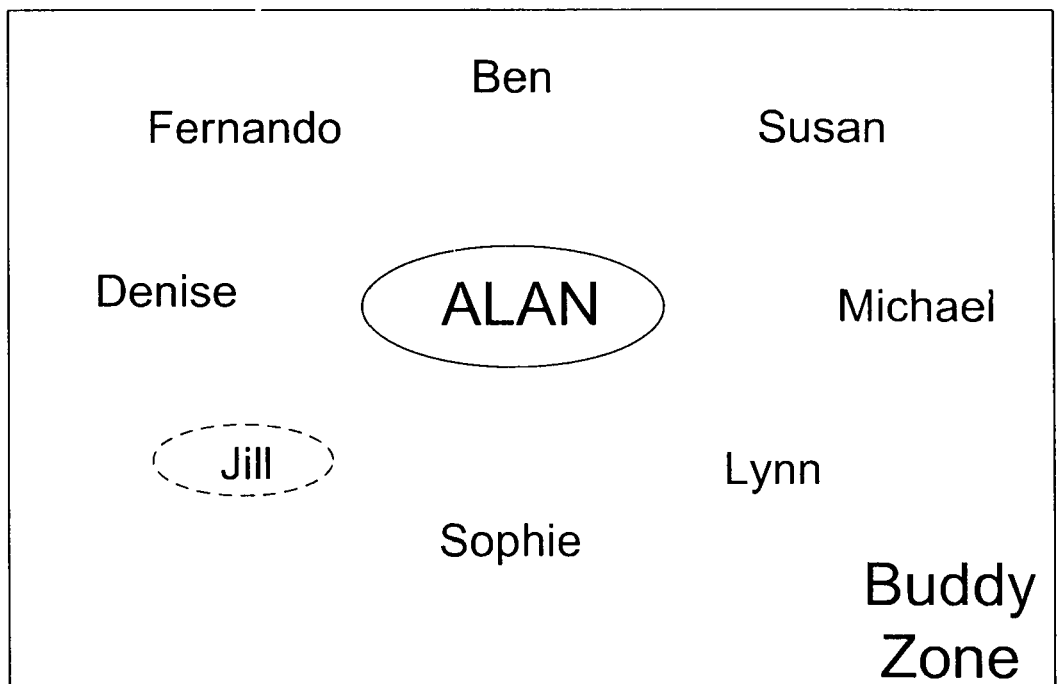
FIG. 8 illustrates an exemplary layout of a screen provided at a particular level of the hierarchical menu structure, the screen being referred to hereinafter as the "buddy screen"

As shown in FIG. 8, the buddy screen 5 has a number of different names available for selection. These names relate to users of other entertainment devices that may be accessed through the entertainment device via a network. The network could be any suitable network, such as a local area network, a wide area network, an intranet, or the internet.

A different name in the buddy screen can be highlighted for selection using an appropriate motion across the first control surface 2 of the remote control handset 1. In the preferred embodiment, this motion is a circular motion, but in alternative embodiments it could be a predominately positive or negative motion in either the x-axis direction or y-axis direction.

Once the desired name has been highlighted for selection using the first control surface 2, the user can select the highlighted name suing an appropriate motion across the second control surface. In the example shown in FIG. 8, a user "Alan" has highlighted the name "Jill" for selection. According to the illustrated embodiment, the appropriate motion across the second control surface 3 would be that which moves from a higher level of the hierarchical menu structure to a lower level of the hierarchical menu structure (i.e. in direction "L") which in the illustrated embodiment is a motion in the predominately positive y-axis and positive z-axis direction.

Once the highlighted name has been selected from the buddy screen 5, the user then has access to a collection screen 6 of the person whose name they have selected from the buddy screen 5. The collection screen 6 of the person whose name has been selected from the buddy screen 5 can be substantially similar to the collection screen 6 of the user himself in terms of the options available. However, preferably there is an additional option in the collection screen 6 of the selected person for "now watching". This option could be selected in the usual manner using the second control surface 3, and enables the user to view the same content, and at the same time, as the person whose name has been selected from the buddy screen 5. The person whose name has been selected from the buddy screen 5 may also have the option of controlling which content is accessible by other users. For example, it may be that they do not want other users to be able to access certain content that they are able to access from their own entertainment device.

Although this embodiment has been described in relation to particular options being selected from the various levels within the hierarchical structure 4, it will be understood that the basic principle of using a first control surface 2 to navigate predominately within a level of a hierarchical menu structure 4, and a second control surface 3 to navigate predominately between levels of the hierarchical menu structure 4 can be applied to any option or level available within any suitable menu structure.

The remote control handset 1 of the present invention has been described with reference to FIGS. 1 and 2. It will be further appreciated that the particular shape of the remote control handset 1 is not limited to that shown in these Figures. Indeed, any suitably intuitive shape could be used for the remote control handset 1, provided that it has a first control surface 2 configured to allow navigation within a level of a hierarchical menu structure and a second control surface 3 configured to allow navigation between the levels of a menu structure.

In particular, the control surfaces 2, 3 of the remote control handset 1 shown in FIGS. 1 and 2 have no variation in a z-axis direction for any cross-section taken through them using an x-z plane. In an alternative embodiment, at least some x-z plane cross-sections through the first and/or second control surfaces 2, 3 could show variation in the z-axis.

By way of further example, the angle to the y-axis formed by the second control surface 3 at its leading edge (i.e. that which is furthest from the first control surface 2, and has the maximum x-axis coordinate associated with it) is not limited to that shown in the Figures. Any suitable angle could be chosen. Preferably, the angle is between 10 and 90 degrees. More preferably, the angle is between 20 and 80 degrees. More preferably, the angle is between 30 and 70 degrees. More preferably, the angle is between 40 and 60 degrees. More preferably, the angle is approximately 50 degrees. Furthermore, the first control surface 2 and/or the second control surface 3 can have a combination of planar and non-planar portions.

The remote control handset 1 can include a motion sensor for sensing the movement of the remote control handset 1. For example, the motion sensor could be a gyroscopic motion sensor configured to sense motion in one, two or three of the x-axis, y-axis, or z-axis directions. The motion sensor provides the remote control handset 1 with a motion sensing capability that can be correlated to a particular aspect of the use or navigation of a graphical user interface 4 of an entertainment device. The motion sensor for the remote control handset 1, and it associated motion sensing capability, can be provided in addition to, or as an alternative to, the first and second control surfaces 2, 3 of the remote control handset 1 discussed above.

As an example, a "flicking" motion of the remote control handset 1 could correspond to turning the entertainment device on or off. Such a motion could be detected by the motion sensor as a rapid acceleration or deceleration (or a combination of the two) in the z-axis direction.

By way of further example, a side-to-side shaking motion of the remote control handset 1 predominately in the x-y plane could be correlated to opening the "home page" of the graphical user interface 4, or returning to that "home page" from any position within the hierarchical menu of the graphical user interface 4. The "home page" can be, for example, the collection screen 6 described above in relation to the first embodiment.

We claim:

1. A remote control handset for navigating a user interface of an entertainment device, the user interface having a hierarchical menu structure with at least two levels, the remote control handset being defined by a first axis extending in a width direction of the remote control handset between opposite respective sides and a second axis orthogonal to the first axis and extending in a longitudinal direction of the remote control handset, the remote control handset comprising:
   a first surface having a substantially planar portion extending in the width direction between said opposite respective sides and that lies substantially in a plane defined by the first axis and the second axis; and
   a second surface extending in the width direction between said opposite respective sides, adjacent to the first surface in the longitudinal direction, and having a component in a third axis that is orthogonal to the first and second axes,
   wherein the first surface forms a first control surface configured to allow navigation within a level of the menu structure; and
   the second surface forms a second control surface configured to allow navigation between the levels of the menu structure.

2. A remote control handset according to claim 1, wherein the first axis is in a width direction of the first control surface;
   the second axis is provided in a longitudinal direction of the first control surface; and
   a cross-section taken at a constant position in the second axis direction, through the first control surface or the second control surface, is a straight line having a constant position in the third axis direction.

3. A remote control handset according to claim 1, wherein at least a part of the second control surface is planar.

4. A remote control handset according to claim 1, wherein the first control surface and the second control surface are immediately adjacent each other.

5. A remote control handset according to claim 4, wherein the first control surface and the second control surface form a single surface having a continuous gradient.

6. A remote control handset according to claim 1, further comprising a third surface, wherein
   the third surface is directly connected to both the first control surface and the second control surface so as to join the first control surface and the second control surface together.

7. A remote control handset according to claim 6, wherein the first control surface, the second control surface, and the third surface form a single surface having a continuous gradient.

8. A remote control handset according to claim 1, wherein one or both of the control surfaces comprises a touchpad.

9. A remote control handset according to claim 1, wherein at least one of the first control surface and the second control surface is configured to be responsive to movement of a finger across its/their surface.

10. A remote control handset according to claim 1, further comprising a motion sensor configured to detect a specific movement of the handset, wherein
    the remote control handset is configured to send a specific command to the entertainment device when the motion sensor senses the specific movement of the handset.

11. A remote control handset according to claim 10, wherein the motion sensor comprises a gyroscopic motion sensor.

12. A remote control handset according to claim 10, wherein the specific movement that the motion sensor is configured to detect comprises acceleration or deceleration of the remote control handset that is above a pre-determined magnitude.

13. A remote control handset according to claim 10, wherein the specific command that is sent to the entertainment device causes the entertainment device to be either turned on, or turned off.

14. A remote control handset according to claim 1, wherein the remote control handset is configured to control a television set via a graphical user interface.

15. A control apparatus for an entertainment device comprising:
   a remote control handset according to claim 1; and
   a user interface for an entertainment device, the user interface having a hierarchical menu structure with at least two levels, wherein
   the remote control handset is configured to navigate the user interface.

16. An entertainment system comprising:
   the control apparatus of claim 15; and
   an entertainment device, wherein
   the control apparatus is configured to control the entertainment device.

17. A method of navigating a user interface for an entertainment device using a remote control handset that is defined by a first axis extending in a width direction of the remote control handset between opposite respective sides and a second axis orthogonal to the first axis and extending in a longitudinal direction of the remote control handset, the user interface having a hierarchical menu structure, the method comprising:
   providing the remote control handset having a first control surface and a second control surface;
   arranging the first control surface with a substantially planar portion extending in the width direction between said opposite respective sides and that lies substantially in a plane defined by the first axis and the second axis;
   arranging the second control surface extending in the width direction between said opposite respective sides, adjacent to the first surface in the longitudinal direction, and with a component in a third axis that is orthogonal to the first and second axes;
   navigating within a level of the hierarchical menu structure using the first control surface; and
   navigating between the levels of the hierarchical menu structure using the second control surface.

* * * * *